United States Patent
Kim et al.

(10) Patent No.: US 9,761,270 B1
(45) Date of Patent: Sep. 12, 2017

(54) DATA STORAGE DEVICE USING HIGH AND LOW FREQUENCIES AC HEAT PRODUCE POSITION-ERROR-SIGNALS FOR HEAD CONTACT DETECTION

(71) Applicant: Seagate Technology LLC, Cupertino, CA (US)

(72) Inventors: Shi Jung Kim, Yongin (KR); Ju Yong Lee, Yongin (KR); YoungJin Son, Yongin (KR)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/386,153

(22) Filed: Dec. 21, 2016

(51) Int. Cl.
| | | |
|---|---|---|
| G11B 20/18 | (2006.01) | |
| G11B 5/596 | (2006.01) | |
| G11B 5/54 | (2006.01) | |
| G11B 15/68 | (2006.01) | |
| G11B 5/58 | (2006.01) | |
| G11B 27/36 | (2006.01) | |
| G11B 19/00 | (2006.01) | |

(52) U.S. Cl.
CPC .......... *G11B 20/18* (2013.01); *G11B 5/59627* (2013.01); *G11B 5/54* (2013.01); *G11B 5/581* (2013.01); *G11B 5/59633* (2013.01); *G11B 5/59638* (2013.01); *G11B 15/6895* (2013.01); *G11B 19/00* (2013.01); *G11B 27/36* (2013.01)

(58) Field of Classification Search
None
See application file for complete search history.

(56) References Cited

U.S. PATENT DOCUMENTS

| | | | |
|---|---|---|---|
| 7,158,325 B1 | 1/2007 | Hu et al. | |
| 8,203,802 B2 * | 6/2012 | Ehrlich | G11B 5/6005 360/31 |
| 8,717,702 B2 | 5/2014 | Zeng et al. | |
| 8,730,602 B2 | 5/2014 | Yang | |
| 8,730,611 B2 | 5/2014 | Liu et al. | |
| 8,837,076 B1 | 9/2014 | Cheng et al. | |
| 8,976,481 B1 * | 3/2015 | Zeng | G11B 5/607 360/48 |
| 8,995,076 B1 * | 3/2015 | Olson | G11B 5/596 360/39 |
| 9,047,898 B2 | 6/2015 | Liu et al. | |
| 9,202,499 B2 | 12/2015 | Kiely et al. | |
| 9,437,234 B1 | 9/2016 | Kim et al. | |

(Continued)

*Primary Examiner* — Tan X Dinh
(74) *Attorney, Agent, or Firm* — Hall Estill Attorneys at Law (57) ABSTRACT

A data storage device may have increased signal-to-noise ratio contact detection by employing a transducing head associated with a data storage medium each connected to a controller. The transducing head can have an alternating current heater excited to a first frequency for a first revolution of the data storage medium and to a different second frequency for a second revolution of the data storage medium. The second frequency may produce lateral transducing head motion as a result of physical contact of the transducing head with the data storage medium. The controller can issue a contact status in response to comparing a first plurality of position error signals logged during the first frequency to a second plurality of position error signals logged during the second frequency.

20 Claims, 5 Drawing Sheets

(56) References Cited

U.S. PATENT DOCUMENTS

| | | | |
|---|---|---|---|
| 9,607,642 B1* | 3/2017 | Yang | G11B 5/6076 360/75 |
| 2005/0088772 A1* | 4/2005 | Baumgart | G11B 5/6005 360/75 |
| 2012/0050907 A1* | 3/2012 | Haapala | G11B 5/40 360/59 |
| 2012/0218659 A1* | 8/2012 | Liu | G11B 5/6076 360/59 |
| 2013/0250446 A1* | 9/2013 | Zeng | G11B 5/607 360/75 |
| 2013/0250455 A1* | 9/2013 | Zeng | G11B 5/455 360/75 |
| 2017/0092313 A1* | 3/2017 | Olson | G11B 5/6011 360/75 |

* cited by examiner

DATA STORAGE DEVICE USING HIGH AND LOW FREQUENCIES AC HEAT PRODUCE POSITION-ERROR-SIGNALS FOR HEAD CONTACT DETECTION

SUMMARY

An increased signal-to-noise ratio is provided in a data storage device, in accordance with some embodiments, with a transducing head and a data storage medium each connected to a local controller. The transducing head has a heater excited by an alternating current at a first frequency for a first revolution of the data storage medium and at a different second frequency for a second revolution of the data storage medium. The second frequency produces lateral transducing head motion as a result of physical contact of the transducing head with the data storage medium. The controller then issues a contact status in response to comparing a first plurality of position error signals logged during the first frequency to a second plurality of position error signals logged during the second frequency.

DETAILED DESCRIPTION

With ever increasing amounts of data being generated, transferred, and stored, the capacity and data access speed of data storage devices are being emphasized. The performance of a data storage device can be degraded when a data access component contacts a rotating data storage medium undetected. Hence, various embodiments are generally directed to structures and methods of detecting contact with increased accuracy, as represented by a heightened contact signal-to-noise ratio (SNR).

Figure 1:
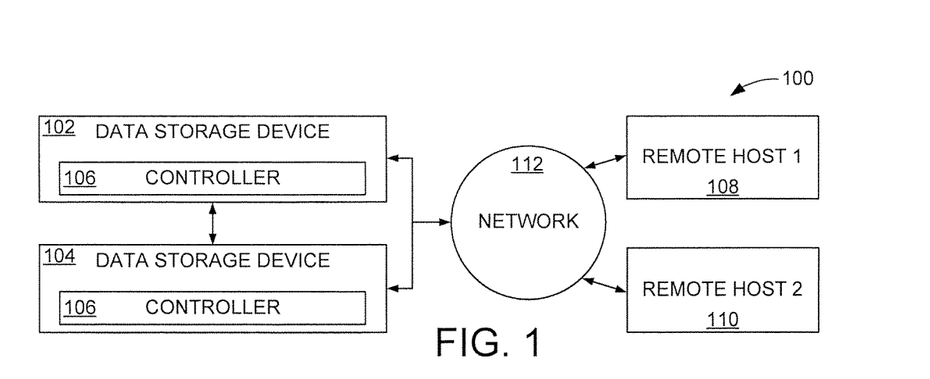
FIG. 1 is a block representation of an example data storage system arranged in accordance with various embodiments.

FIG. 1 is a block representation of an example data storage system 100 in which embodiments of the present disclosure can be employed. The data storage system 100 can employ one or more data storage devices, such as the first 102 and second 104 data storage devices. The data storage devices may be operated independently or concurrently and may be interconnected to provide a collective data storage capacity that is greater than either device 102/104 individually. It is noted that the data storage devices 102/104 can be similar, or dissimilar, types of memory with matching, or different, sizes, capacities, and data access speeds.

While the data storage devices 102/104 may operate as directed by local controllers 106, at least one remote host, such as the first 108 and second 110 remote hosts, can separately or concurrently direct operations in one, or both, data storage devices 102/104 via a wired and/or wireless network 112. For example, the first remote host 108 can be a processor or server that requests data to the first data storage device 102 while the second remote host 110 is a node that issues a data write command to the second data storage device 104. The ability to utilize multiple separate data storage devices 102/104 with one or more remote hosts 108/110 allows the data storage system 100 to provide large data capacities along with fast data access speeds when working at nominal operating conditions.

Figure 2A:
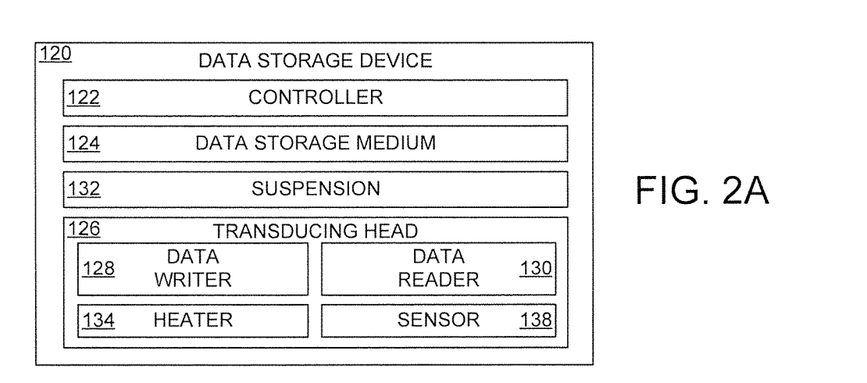
FIGS. 2A and 2B respectively represent portions of an example data storage device capable of being used in the data storage system of FIG. 1.
Figure 2B:
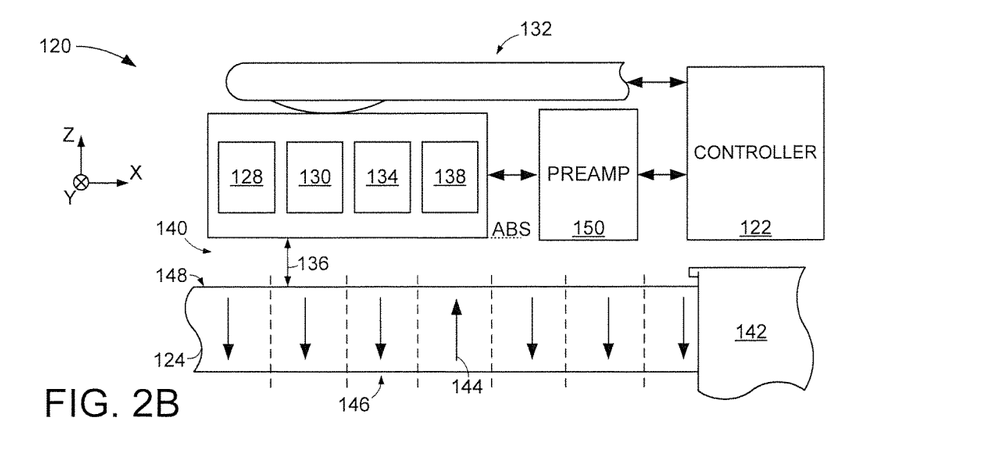

FIGS. 2A and 2B respectively represent portions of an example data storage device 120 that can be utilized in the data storage system 100 of FIG. 1. While not limiting, FIG. 2A shows the data storage device 120 containing a controller 122, which may be additional to the local controller 106, that directs operation of a magnetic data storage medium 124 and transducing head 126 to conduct data access operations, such as writing data to and reading data from the data storage medium 124. That is, the controller 122 can direct movement and activation of data writer 128 and data reader 130 portions of the transducing head 126 as well as operation of a suspension 132, which can have at least a head-gimbal assembly (HGA) and actuating means.

The transducing head 126 can further have a heater 134, such as a resistance device, that can selectively alter the shape of at least a portion of the transducing head 126 to control the position of the head 126 relative to the data storage medium 124, as shown by air bearing size 136 in FIG. 2B. For instance, the position of the transducing head 126 is sensed by one or more sensors 138, such as a thermal proximity sensor, as the head 126 flies above the spinning data storage medium 124 on an air bearing 140 that can be manipulated via movement of the spindle motor 142 and the actuating suspension 132.

By reducing the size 136 of the air bearing, the data writer 128 and data reader 130 can accurately access a greater resolution of data bits 144 stored in data tracks 146 of the data storage medium 124. While the increased data bit resolution provided by a smaller air bearing size 136 can theoretically provide improved performance, imperfections in the recording surface 148 of the data storage medium 124, along with operational variation in the actuating suspension 132, can result in unwanted contact between the transducing head 126 and the recording surface 148. Such contact can degrade the data storage medium 126 and produce debris that can proliferate throughout a data storage device 120 and produce errors and failures.

In an effort to increase contact detection accuracy with relatively lower air bearing sizes 136 being employed, such as below 100 nm, the controller 122 can direct a preamp 150 to continuously, sequentially, or randomly provide a low frequency alternating current to the heater (LFACH) that operates with on or more sensors 138 to detect head-medium contact. For example, a dual ended temperature coefficient of resistance (DETCR) sensor 138 can identify heat transfer signatures that correspond with head-medium contact when the size of the air bearing 136 (fly height) is modulated in a LFACH scheme where the fly height oscillates in concert with the LFACH voltage. It is noted that LFACH corresponds with frequencies that produce modulating air bearing sizes 136, such as under 1 kHz. In contrast, higher heater frequencies (>1 kHz) would not modulate air bearing size 136 due to the heater 134 not responding to fluctuations in power dissipated by the heater 134.

While fly height modulation and thermal sensor 144 contact detection can be useful in relatively small air bearing sizes 136 where a thermal sensor 144 produces a relatively uniform signal during head-medium contact, such contact detection scheme can be inaccurate in low fly height environments. That is, small air bearing sizes 136 result in a relatively stiff air bearing 140 that is not conducive to thermal variations that would otherwise allow a thermal sensor 138 to detect head-medium contact. Such a stiff air bearing 140 and low fly height also results in poor SNR when LFACH is employed due, at least in part, to the thermal sensor 138 being physically close to the heater 134.

Figure 3:
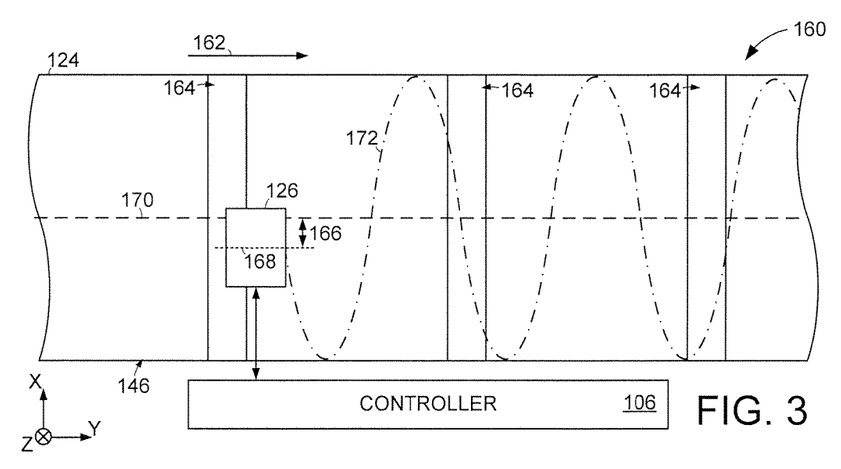
FIG. 3 displays a top view line representation of a portion of an example data storage device operated in accordance with various embodiments.

Thus, a high frequency alternating current heater (HFACH) scheme has been developed for relatively low air bearing sizes 136. FIG. 3 illustrates a line representation of a portion of an example data storage device 160 that can execute HFACH contact detection scheme in the data storage system 100 of FIG. 1. During data reading and/or data writing operations between the transducing head 126 and one or more data tracks 146 of a data storage medium 124, a relatively high frequency alternating current (>1 kHz), such as 4-10 kHz, is sent to the head heater 134. In some embodiments, the HFACH frequency is greater than the bandwidth of the voice coil motor of the actuating suspension 132, and frequency of servo data, to allow for reliable detection of slider oscillation during head-medium contact.

In contrast to LEACH signals that vary air bearing size 136 due to the signal being at, or lower, than the thermal time constant of a protruding portion of the head 126, HFACH signals reduce, or eliminate, air bearing modulation by providing heater signals above the thermal time constant of the head 126 (>1 kHz), which induces mechanical oscillation in the head 126 at a frequency greater than which the head 126 can respond. Therefore, the supply of relatively high frequencies to the head heater 134 produces substantially random excitation of the head 126 along the X-Y plane and minimal air bearing modulation during normal data access operations (read/write). During normal data access operations, the head 126 travels along the data track 146 in direction 162 while the high frequencies of the HFACH scheme produce random position error signal (PES) as recognized by the controller 106 in response to reading non-user servo data located in servo regions 164 along the data track 146. It is noted that PES can measure the distance 166 in which a longitudinal axis 168 of the head 126 is offset from a data track centerline 170 or other predetermined reference point along the width of the data track 146.

When the head 126 contacts the data storage medium 124, the HFACH heater frequency produces X-Y plane oscillation along the data track 146, as shown by segmented line 172. Such head 126 oscillation is recognized by the controller 106 when PES signals suddenly change and the controller 106 is triggered to compensate for the incorrect position of the head 126 by activating one or more actuating means. While the post-contact head movement is illustrated as cyclical, such movement is merely exemplary and the actual head modulation during contact depends on the skew angle of the head 126 relative to the medium 124. That is, high HFACH frequencies can produce different head 126 movement and PES readings during contact for different portions of the medium 124 due to the longitudinal axis 168 being skewed relative to the track centerline 170 of the track 146 where contact occurs.

With variations in head skew angle and repeatable runout (RRO) for the data storage device 160, track-to-track variations are present that hinder the repeatability of HFACH contact detection and contact SNR. Although higher heater frequencies, and induced oscillations, have been contemplated to improve contact SNR, such higher frequencies can create baseline RRO variations and induce track-to-track variations. Hence, various embodiments are directed to increasing contact SNR without increasing heater oscillation beyond a frequency threshold (4-10 kHz) needed to induce minimal air bearing size modulation and measurable X-Y plane modulation (line 172) in response to head-medium contact.

Figure 4:
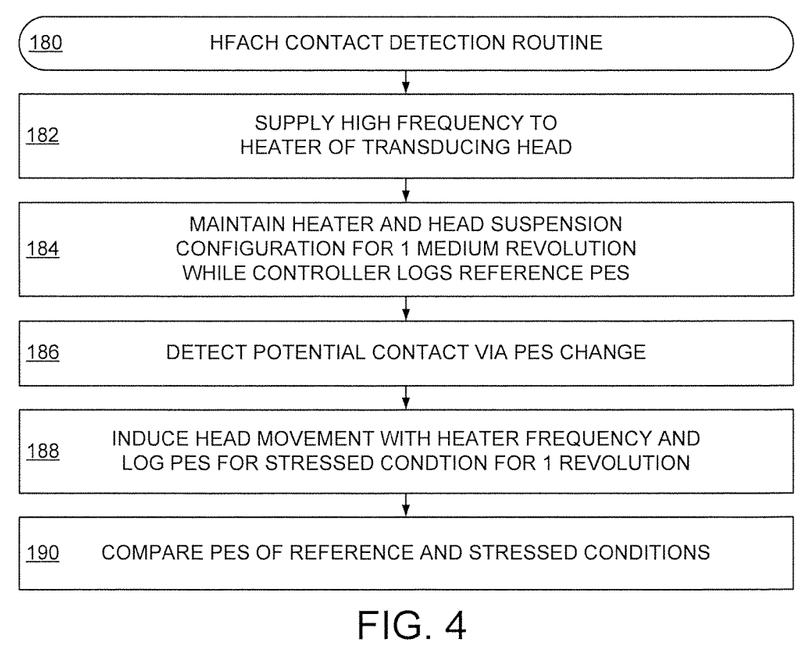
FIG. 4 depicts an example HFACH contact detection routine that can be carried out by the data storage system of FIG. 1.

FIG. 4 is a flowchart of an example HFACH contact detection routine 180 that employs reference and stressed medium revolutions to increase contact SNR. In step 182, the heater of at least one transducing head of a data storage device is continuously supplied with a high frequency, such as 4-10 kHz. A reference condition is created in step 184 by maintaining heater and head suspension conditions for one medium revolution while the controller logs the PES signals throughout the revolution. For instance, step 184 can maintain the heater frequency, microactuation signals, and RRO correction for the revolution along a data track.

A sudden change in PES signals is detected by a controller in step 186 to indicate potential head-medium contact prior to the heater frequency inducing head movement in step 188 that is recorded by the controller as PES along a revolution of the medium, which can be characterized as a stressed condition. The PES signals of the reference and stressed conditions are compared in step 190 to determine if the sudden change in PES from step 186 was caused by actual head-medium contact or by some other event, such as operational variation, device trauma, or actuating error.

Figure 5A:
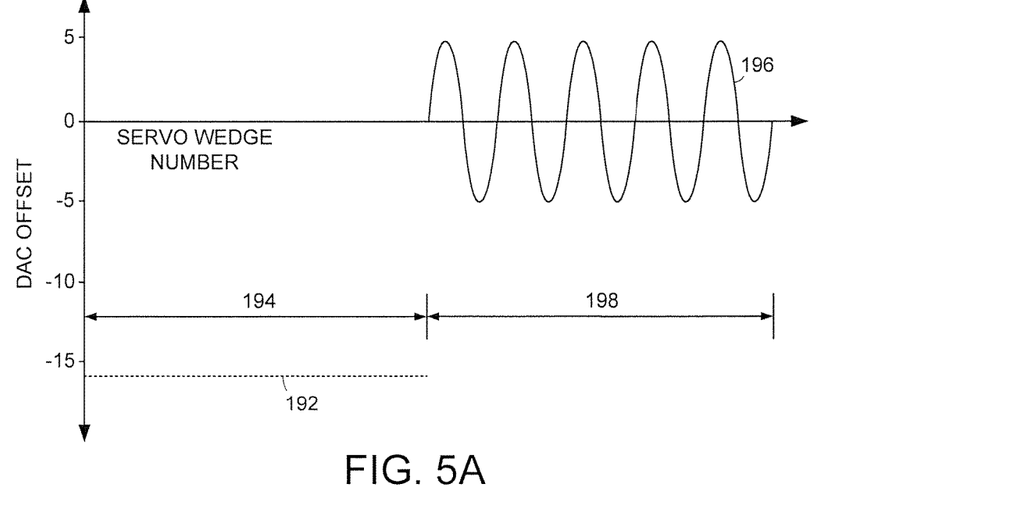
FIGS. 5A & 5B respectively plot operational data for an example data storage device employed in accordance with some embodiments.
Figure 5B:
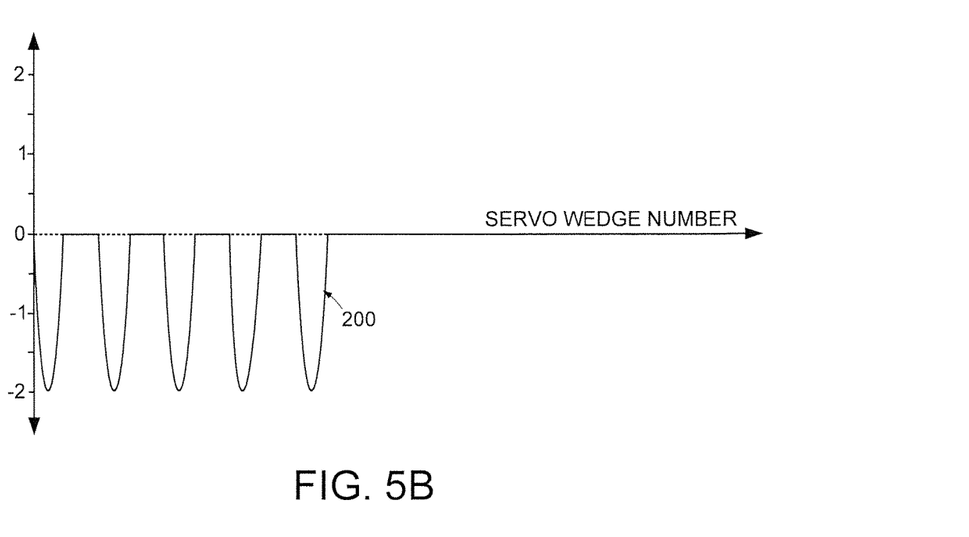

As a result of the comparison of step 190, PES motion can be plotted. FIGS. 5A and 5B respectively plot head motion for various servo positions around a data storage medium during execution of routine 180. FIG. 5A conveys the amount of power supplied to the head heater (DAC Offset) for various servo wedges around a data storage medium. Segmented line 192 illustrates how a reference condition can correspond with no modulation of the heater power for a predetermined number 194 of servo wedges, such as 576 separate servo wedges that each radially extend from a the spindle motor 142 and collectively extend around the complete circumference of the data storage medium. It is noted that the reference condition may supply high frequency alternating current to the head heater or may maintain a uniform heater power to provide the reference condition.

Solid line 196 cyclically varies in accordance with the high frequency supplied to the head heater for a second predetermined number of servo wedges 198. In some embodiments, the number of servo wedges 194 and 198 are the same and are the number of wedges encountered during one revolution of the data storage medium. FIG. 5B displays how head motion is measured when the device controller processes and compares the reference condition to the first stressed condition. The half sine wave 200 provides some contact detection signal, but not enough to reliably conclude contact has occurred, at least partially due to track-to-track variations along with skew angle of the transducing head.

Accordingly, the HFACH frequency can be altered in accordance with some embodiments to produce a full sine wave, which corresponds with a greater SNR and more accurate contact detection. By altering the heater characteristics from the stressed condition in step 188 of FIG. 4, an opposite phase of head movement can be induced that can be processed along with the reference and first stressed conditions to produce a full sine wave and optimized contact SNR.

Figure 6:
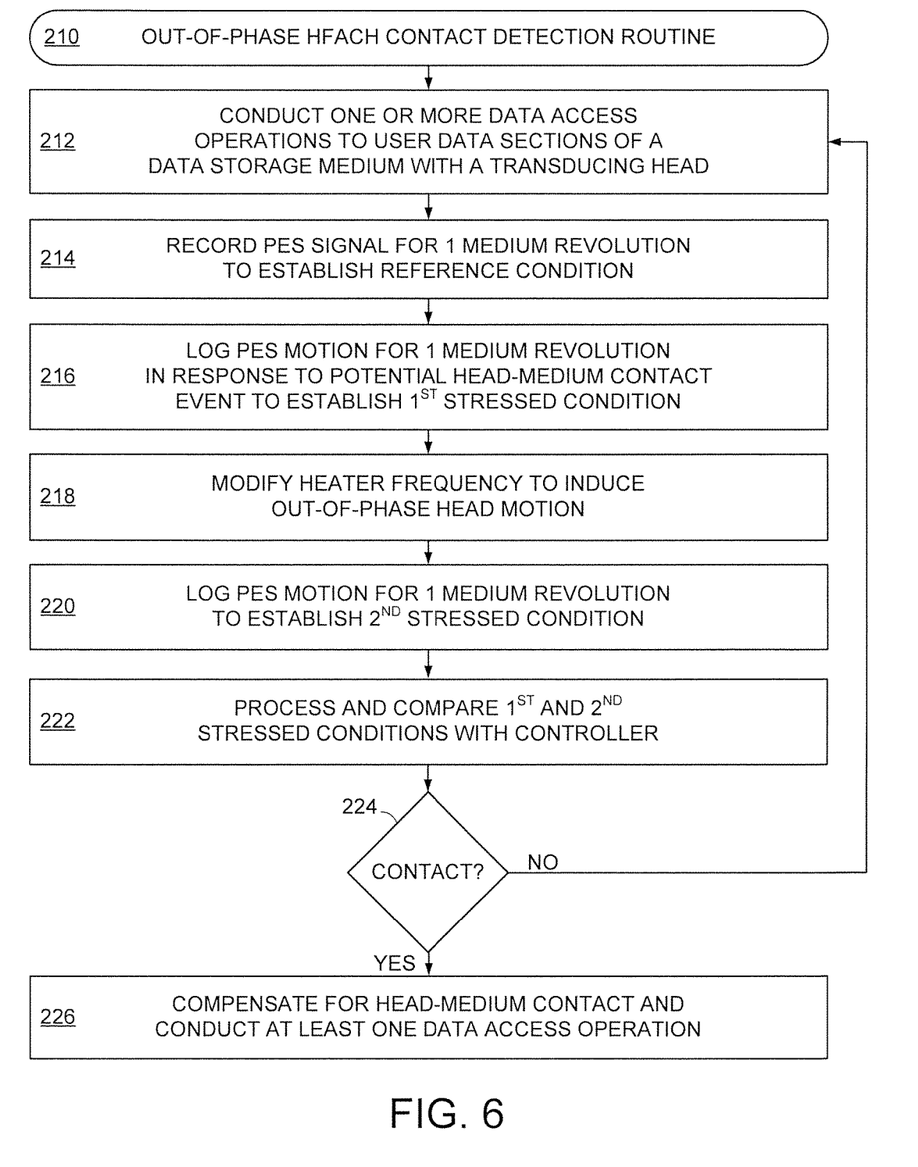
FIG. 6 provides a flowchart of an example out-of-phase contact detection routine performed in accordance with various embodiments.

FIG. 6 maps how a second stressed condition is utilized in an example out-of-phase HFACH contact detection routine 210 to provide a full sine wave of head motion in response to head-medium contact. Initially, step 212 conducts one or more data access operations to, or from, user data sections of a data storage medium with a transducing head while a heater of the head is supplied with a high frequency above the bandwidth of the voice coil motor and the thermal time constant of the material of the head. It is expected that step 212 is executed while the transducing head is separated from the recording medium by an air bearing that experiences little, or no, modulation.

The PES of the head is recorded by a controller in step 214 for a complete revolution of the data storage medium after, or during, the data access operations of step 212. The PES signals recoded in step 214 are stored as a reference condition to be compared to a later stressed condition where head-medium contact is suspected. It is contemplated that the stored PES signals correspond with a particular data track or region of the data storage medium and the local controller stored multiple different reference PES conditions concurrently. When triggered by a potential head-medium contact, step 216 begins logging the motion of the head around the entirety of the data storage medium via logged PES. The head motion establishes a first stressed condition and is modulated by the high frequency continually supplied to the head heater from step 212.

A controller then modifies the heater frequency in step 218 to produce out-of-phase head motion that is logged as PES in step 220 for at least one revolution of the data storage device to provide a second stressed condition. It is noted that step 220 may not alter the head position (heater voltage) and/or suspension (microactuator) settings during the second stressed condition, which can be characterized as having zero back-off from the first stressed condition to the second stressed condition. The first and second stressed conditions are processed and compared in step 222 to determine if head-medium contact has occurred. For instance, by modifying a 64×90 Hz heater signal during the first stressed condition to a 60.5×90 Hz heater signal for the second stressed condition, the induced head motion can complement each other and provide a full sine wave that increases contact SNR. It is noted that an additional step can be conducted between steps 220 and 222 that processes and compares the reference condition to the first stressed condition.

Such heightened contact SNR allows decision 224 to reliably conclude that contact detection has, or has not, happened. In the event contact has occurred, step 226 compensates to establish a consistent air bearing so that further data access operations can be conducted. The contact may be so severe that the controller compensates by deactivating the transducing head. Such deactivation may be conducted after moving data from the data storage medium to another storage location. If the controller determines from step 224 that contact has not occurred, the routine returns to step 212. It is contemplated that an additional step may verify proper operation of the transducing head by writing and subsequently reading test data to the data storage medium. When returning to step 212 from decision 224, head operation may be tested by measuring PES for a number of medium rotations without reading or writing data.

Figure 7A:
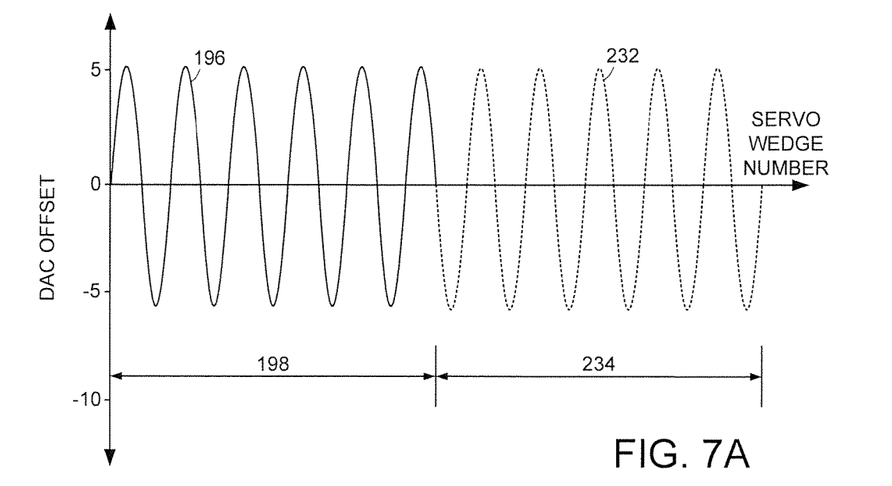
FIGS. 7A & 7B respectively graph operational data for an example data storage device operated in accordance with assorted embodiments.
Figure 7B:
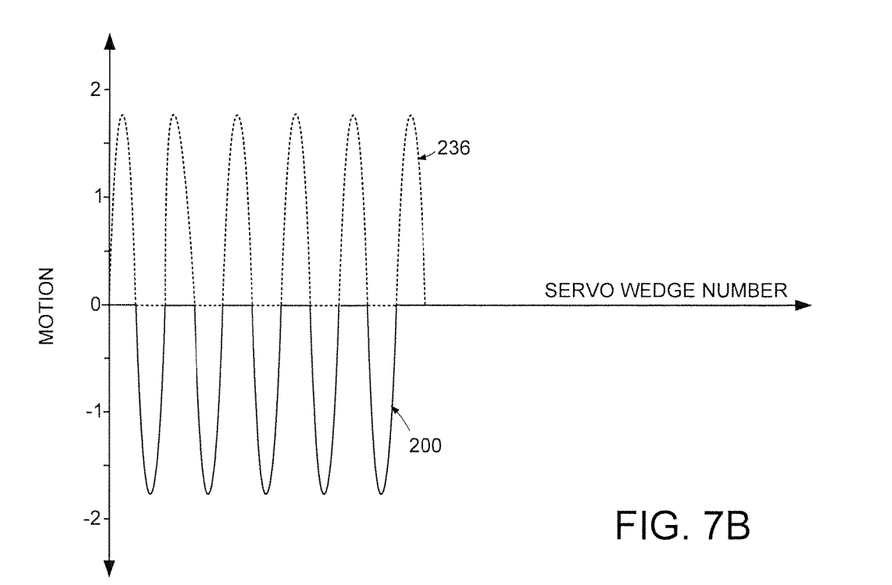

FIGS. 7A and 7B respectively graph signals associated with execution of routine 210 to obtain a full sine wave of head motion in response to head-medium contact. FIG. 7A plots the supplied head heat power (DAC Offset) for the first stressed condition 196 (from FIG. 5A) as well as for the second stressed condition, as illustrated by segmented line 232, for a plurality of servo wedges. While the number of servo wedges for the second stressed condition 234 can match the number of wedges for the first stressed condition 198 and match exactly one revolution around the data storage medium, such arrangement is not required. For example, the second stressed condition may collect data for two medium revolutions, such as 1152 consecutive servo wedges, that doubles the wedge number 198 for the second stressed condition.

Comparison of FIG. 5A to FIG. 7A conveys how the addition of the out-of-phase heater frequency provides optimized PES data that is easily recognized by a controller as head-medium contact. In other words, the combination of different high frequency heater signals produces the full sine wave of FIG. 7B when the PES data of first stressed condition (200) is processed and combined with the PES data of the second stressed condition (236) by the controller.

It can be appreciated that the first stressed condition provides half a sine wave 200 and the second stressed condition completes the sine wave by providing the out-of-phase half 236. The ability to evaluate a full sine wave worth of data compared to merely a half sine wave, as in FIG. 5B, allows head-medium contact to more accurately diagnose contact as actual contact or some other non-contact abnormality, such as actuation error or device trauma.

Through the comparison of two out-of-phase stressed HFACH conditions, track-to-track variations can be compensated for without increasing heater frequency. The increased amount of PES data provided by comparing first and second stressed conditions allows a controller to more accurately diagnose head-medium contact for small air bearing data storage environments where minimal air bearing modulation is employed.

It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. An apparatus comprising a transducing head and a data storage medium each connected to a controller, the transducing head having an alternating current heater excited to a first frequency for a first revolution of the data storage medium and to a different second frequency for a second revolution of the data storage medium, the second frequency producing lateral transducing head motion as a result of physical contact of the transducing head with the data storage medium, the controller issuing a contact status in response to comparing a first plurality of position error signals (PES) logged during the first frequency to a second plurality of PES logged during the second frequency.

2. The apparatus of claim 1, wherein the first and second revolutions are each conducted with an air bearing surface of 100 nm or less.

3. The apparatus of claim 1, wherein the first and second frequencies are each greater than the bandwidth of a voice coil motor of a suspension attached to the transducing head.

4. The apparatus of claim 1, wherein the first and second frequencies are each greater than a thermal time constant of the transducing head.

5. The apparatus of claim 1, wherein the first frequency corresponds with uniform power supplied to the alternating current heater.

6. The apparatus of claim 5, wherein the second frequency corresponds with varying power supplied to the alternating current heater.

7. The apparatus of claim 1, wherein the first plurality of PES is processed by the controller to provide a reference condition.

8. The apparatus of claim 7, wherein the second plurality of PES is processed by the controller to provide a stressed condition.

9. The apparatus of claim 1, wherein the first and second frequencies each do not produce transducing head motion parallel to a recording surface of the data storage medium until the physical contact.

10. An apparatus comprising a transducing head and a data storage medium each connected to a controller, the transducing head having an alternating current heater excited to a first frequency for a first revolution of the data storage medium and to a different second frequency for a second revolution of the data storage medium, the first and second frequencies being out-of-phase and each producing lateral transducing head motion as a result of physical contact of the transducing head with the data storage medium, the controller issuing a contact status in response to comparing a first plurality of position error signals (PES) logged during the first frequency to a second plurality of PES logged during the second frequency.

11. The apparatus of claim 10, wherein the transducing head is maintained at a predetermined suspension configuration throughout the first and second frequencies.

12. The apparatus of claim 10, wherein each revolution collects PES for 576 separate servo wedges.

13. The apparatus of claim 10, wherein the controller processes the first plurality of PES into a first half sine wave and the second plurality of PES into a second half sine wave, each half sine wave representing transducing head motion.

14. The apparatus of claim 13, wherein the first and second half sine waves combine to form a full sine wave.

15. A method comprising:
    positioning a transducing head proximal a data storage medium, the transducing head and data storage device each connected to a controller;
    exciting a heater of the transducing head with an alternating current at a first frequency;
    collecting a first plurality of position error signals (PES) for a first revolution of the data storage medium while the heater is excited to the first frequency,
    generating a second frequency with the controller, the first and second frequencies being out-of-phase;
    exciting the heater with an alternating current at the second frequency;
    logging a second plurality of PES for a second revolution of the data storage medium while the heater is excited to the second frequency;
    comparing the first and second pluralities of PES with the controller to identify physical contact between the transducing head and the data storage medium; and
    issuing a contact status with the controller as a result of the identified physical contact.

16. The method of claim 15, wherein the first and second frequencies each inducing lateral transducing head motion in response to the transducing head contacting the data storage medium.

17. The method of claim 15, wherein the second frequency is selected by the controller to produce a full sine wave of transducing head motion in the comparing step.

18. The method of claim 15, wherein the position of the transducing head relative to the data storage medium is maintained during the first and second revolutions.

19. The method of claim 15, wherein a reference plurality of PES is initially compared to the first plurality of PES by the controller prior to the comparing step.

20. The method of claim 15, wherein the first and second frequencies are each in the range of 4-10 kHz.

* * * * *